July 23, 1929.  R. T. WINDLE  1,722,168
SIGNALING APPARATUS
Filed March 23, 1928
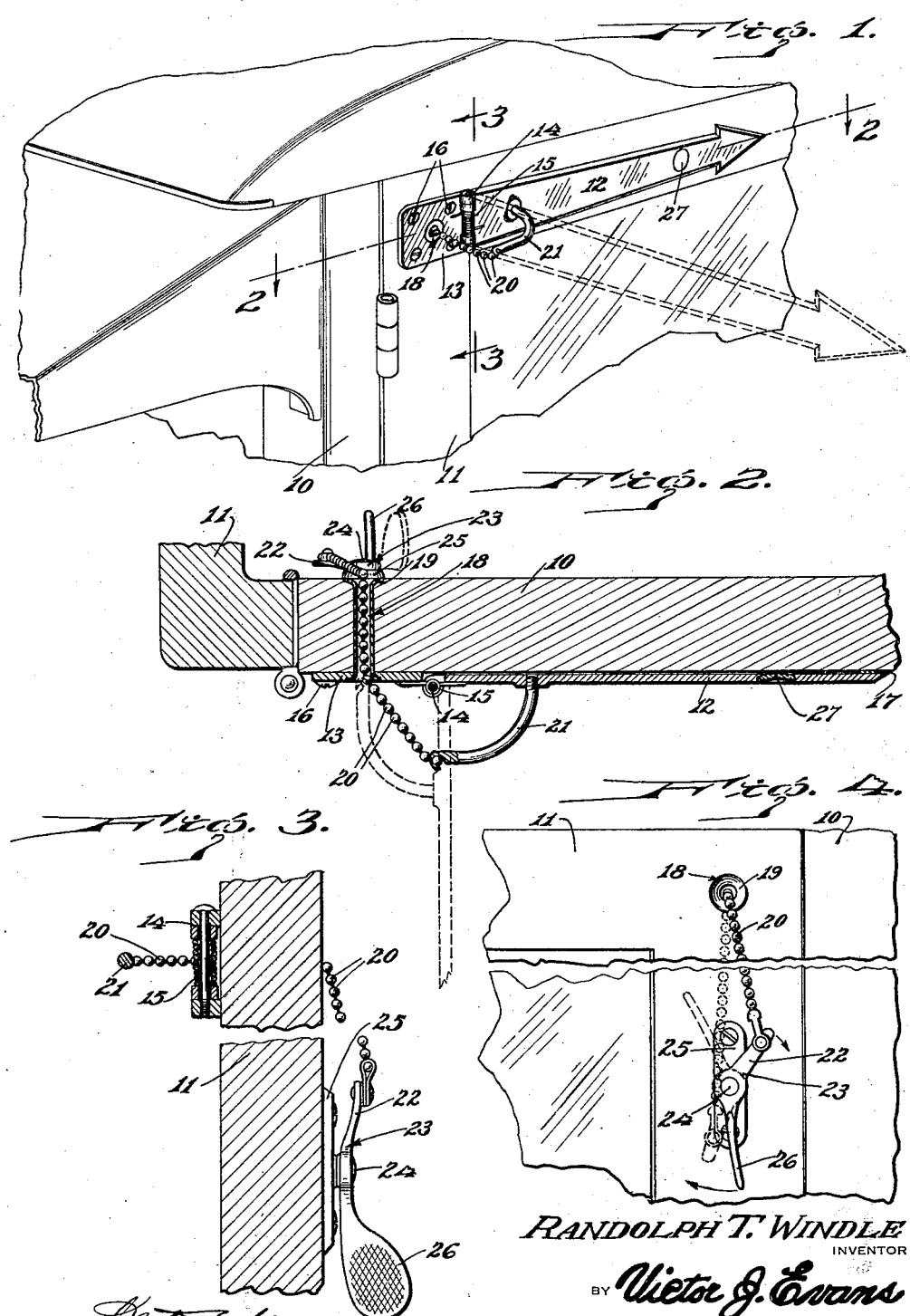
RANDOLPH T. WINDLE
INVENTOR Patented July 23, 1929.

1,722,168

UNITED STATES PATENT OFFICE.

RANDOLPH T. WINDLE, OF NEW YORK, N. Y.

SIGNALING APPARATUS.

Application filed March 23, 1928. Serial No. 264,185.

This invention relates to improvements in signaling apparatus for motor vehicles and has particular reference to a device for indicating an intended turn or stop of the vehicle.

The primary object of the invention resides in a signaling apparatus which includes an arm in the shape of an arrow which is swingingly mounted on the side of motor vehicle and normally held in a non-indicating position flat against the side of the body of the vehicle, and which may be manually operated from within the vehicle by the driver thereof for moving the same to an extended position which signifies the intention of the driver to make a right or left turn, or to bring the vehicle to a stop, and which is visible to drivers of other vehicles in the front or rear.

Another object of the invention is to provide a signaling device which is easily operated by the driver and which may be held in a signaling position as long as desired without necessitating the use of the driver's hand in holding the same in such position.

A further object is the provision of a signaling apparatus which is extremely simple of construction and operation, easy to install, and which will remain in working condition indefinitely without becoming out of order.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a fragmentary perspective view of a motor vehicle with my improved signaling devices installed thereon.

Figure 2 is a horizontal sectional view on the line 2—2 of Figure 1.

Figure 3 is a vertical sectional view on the line 3—3 of Figure 1.

Figure 4 is an elevational view of the actuating mechanism disposed on the inside of the vehicle.

Referring to the drawing by reference characters, the numeral 10 designates a portion of a motor vehicle of the closed type which includes a hinged door 11 beside which the driver of the vehicle sits during the operation thereof.

My improved signaling apparatus includes a signaling arm 12 constructed of a relatively flat material and having the general shape of an arrow. The arm is swingingly connected to an attaching plate 13 by a hinge joint 14 in which a spring 15 is arranged. The attaching plate 13 is fixed to the outside of the door 11 at the top cross rail thereof by screws or like fastening elements 16 whereupon the spring 15 tends to normally hold the indicating arm 12 flat against the top rail in a non-indicating position. The outer end of the arm carries a rubber bumper or cushion 17 on its inner face for preventing the arm from marring the door during its engagement therewith.

A hole is provided in the door for the reception of a tubular sleeve 18 which may be constructed of a single length of tubing or may be made of several telescoping sections, depending upon the thickness of the same. The outer end of the sleeve opens through the attaching plate 13 and is fixed thereto while the inner end of the same is flared as at 19 and disposed flush with the inside of the door. A flexible element 20 in the nature of a chain freely passes through the sleeve and has its outer end fixedly connected to a curved arm 21 which is carried by the arm and extends outwardly therefrom. The inner end of the chain is connected to the arm 22 of an actuating member 23, pivoted as at 24 to a plate 25 mounted on the inside of the door. The actuating member is provided with a manipulating handle 26 which extends at an obtuse angle from the axis of the member with respect to the arm 22. The arm 22 and handle 26 normally extend to one side of the vertical axis of the member as shown in Figure 4 of the drawings, but upon movement of the actuating member to signaling position, the arm 22 and handle 26 move to the opposite side of the vertical axis as shown in dotted lines in Figure 4 whereupon the signaling arm 12 is held in a locked signaling position. The chain 20 moves past center, or over the pivot 24 during movement of the apparatus to a signaling position and locks therebehind to aid in holding the parts in signaling position against the action of the spring 15. Moving of the actuating member is limited by reason of the handle 26 striking the lower end of the chain after the lever 22 passes center.

A red jewel or bull's eye 27 is mounted in the outer end of the signal arm 12, whereupon the headlights of an approaching vehicle will illuminate the same when driving at night as the signal arm is swung to a signaling position.

It is the common practice of drivers of motor vehicles when contemplating a turning or a stop to insert their arm outside the window of a closed type which necessitates having the window open when driving in inclement weather. However, it is possible with my signaling apparatus to give the proper signal with the window in a closed position and which is operated by the driver, who merely grasps the handle 26 and moves the same to the dotted position shown in Figure 4, whereupon the pull on the chain 20, causes the arm 12 to swing to a position at right angle to the body of the vehicle against the action of the spring 15. As hereinbefore stated, the arm remains in such position by reason of the position of the actuating member and chain without requiring the manual holding of the same. To release the signal arm, the operator touches the handle 26 and swings the actuating member to a position where the arm 22 passes to the opposite side of the vertical axis of the same, at which time the spring 15 returns the signal arm to a position flat against the door to a non-indicating position.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In combination with the body of a motor vehicle, a signal arm swingably mounted on the exterior thereof, spring means tending to hold said signal arm parallel to said body, a flexible member fixedly connected to said signal arm and passing through said body to the inside thereof, and an actuating member pivotally mounted parallel with and on the inside of said body to which the inner end of said flexible member is connected.

2. In combination with the body of an automobile, a signal arm hingedly mounted on the exterior thereof, spring means tending to hold said signal arm parallel with respect to said body, a curved arm extending outwardly from said signal arm, said body having a passage therethrough to the inside thereof, a flexible element having one end fixedly connected to said curved arm, an actuating member pivoted on the inside of said body for parallel movement therewith and embodying an arm and a manipulating handle, the inner end of said flexible element being fixedly connected to said arm, whereby movement of said manipulating handle to move said arm from one side of the vertical axis of said actuating member to the other will cause a pull on said flexible element to swing said signal arm to signaling position against the action of said spring and will cause said manipulating handle to engage said flexible element to hold said signal arm in signaling position.

3. A signal apparatus for motor vehicles comprising an exteriorly located attaching plate, a signal arm hingedly connected thereto, spring means tending to swing said signal arm in one direction, a curved arm extending from said signal arm, a flexible element movably positioned in the wall of a motor vehicle and having one end fixedly connected to said curved arm, and an interiorly located actuating member adapted to be pivotally mounted upon a support embodying a radially extending arm to which the other end of said flexible element is connected, substantially as and for the purpose specified.

4. A signal apparatus for motor vehicles comprising an exteriorly located attaching plate, a signal arm hingedly connected thereto, spring means tending to swing said signal arm in one direction, a curved arm extending from said signal arm, a tube adapted to be mounted in the support on which the apparatus is mounted, a flexible element having one end fixedly connected to said curved arm, and passing through said tube, and an interiorly located actuating member adapted to be pivotally mounted upon a support embodying a radially extending arm to which the other end of said flexible element is connected, and a manipulating handle extending from said actuating member at an angle with respect to said arm, substantially as and for the purpose specified.

5. In a signal apparatus, an attaching plate rigidly mounted on the body of a motor vehicle, an indicating arm hingedly connected to said attaching plate, spring means between the attaching plate and said arm for normally holding the latter parallel with and against the outside of said body, a curved arm carried by the inner end of said signal arm, a tube extending transversely through said body, a flexible element passing through said tube and attached by its outer end to the free end of said curved arm, a lever disposed parallel with and pivoted on the inside of said body, said lever having a long actuating arm, and a short arm to which the inner end of said flexible element is attached for exerting an inward pull on said flexible element upon manipulation of said actuating arm to move said hinged arm against the action of said spring means, to a signaling position at right angles to the outer side of the body of the vehicle, said indicating arm being removably retained in the signaling position by said lever.

In testimony whereof I have affixed my signature.

RANDOLPH T. WINDLE.